US007509881B2

(12) United States Patent
Divigalpitiya et al.

(10) Patent No.: US 7,509,881 B2
(45) Date of Patent: Mar. 31, 2009

(54) INTERDIGITAL FORCE SWITCHES AND SENSORS

(75) Inventors: Ranjith Divigalpitiya, London (CA); Pei-Jung Chen, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 123 days.

(21) Appl. No.: 11/192,780

(22) Filed: Jul. 29, 2005

(65) Prior Publication Data

US 2007/0022828 A1 Feb. 1, 2007

(51) Int. Cl.
*G01D 7/00* (2006.01)

(52) U.S. Cl. .................................................. 73/862.041

(58) Field of Classification Search ............. 73/862.041
See application file for complete search history.

(56) References Cited

U.S. PATENT DOCUMENTS 3,475,213 A 10/1969 Stow
3,699,294 A 10/1972 Sudduth
3,879,618 A * 4/1975 Larson ....................... 307/116
4,098,945 A 7/1978 Oehmke
4,164,634 A 8/1979 Gilano
4,307,275 A * 12/1981 Larson et al. ............... 200/512
4,317,013 A * 2/1982 Larson ....................... 200/5 A
4,385,215 A * 5/1983 Lemberg .................... 200/5 A
4,421,958 A 12/1983 Kameda
4,575,580 A 3/1986 Jandrell
RE32,180 E 6/1986 Lewiner et al.
4,644,101 A 2/1987 Jin et al.
4,775,765 A 10/1988 Kimura et al.
4,801,771 A * 1/1989 Mizuguchi et al. ........ 200/86 R
4,829,349 A 5/1989 Luryi
4,914,416 A 4/1990 Kunikane
4,963,417 A 10/1990 Taniguchi et al.
5,209,967 A 5/1993 Wright et al.
5,243,162 A 9/1993 Kobayashi
5,296,837 A 3/1994 Yaniger
5,302,936 A 4/1994 Yaniger
5,371,327 A 12/1994 Fujinami et al.

(Continued)

FOREIGN PATENT DOCUMENTS

DE 41 14 701 A1 11/1992

(Continued)

OTHER PUBLICATIONS

Fulton et al., Electrical and Mechanical Properties of a Metal-Filled Polymer Composite for Interconnection and Testing Applications, AT&T Bell Laboratories, 0569-5503/89/0071, May 22, 1989.

(Continued)

*Primary Examiner*—Harshad Patel
*Assistant Examiner*—Octavia Davis

(57) ABSTRACT

An interdigital electronic device comprises a conductor, an interdigital electrode, and a composite material disposed between the conductor and the interdigital electrode for electrically connecting the conductor and the interdigital electrode under application of sufficient pressure therebetween. The composite material comprises conductive particles at least partially embedded in an electrically insulating layer. The conductive particles have no relative orientation and are disposed so that substantially all electrical connections made between the conductor and the interdigital electrode are in the z direction. At least one of the conductor and the interdigital electrode is movable toward the other.

20 Claims, 4 Drawing Sheets

U.S. PATENT DOCUMENTS

| | | | |
|---|---|---|---|
| 5,593,395 | A | 1/1997 | Martz |
| 5,898,426 | A | 4/1999 | Kim |
| 5,925,001 | A | 7/1999 | Hoyt et al. |
| 5,986,223 | A | 11/1999 | Kim |
| 5,995,198 | A | 11/1999 | Mizutani |
| 5,997,996 | A | 12/1999 | Tamura |
| 6,073,497 | A | 6/2000 | Jiang et al. |
| 6,078,274 | A | 6/2000 | Inou |
| 6,088,024 | A | 7/2000 | Yamagata |
| 6,114,645 | A | 9/2000 | Burgess |
| 6,118,435 | A | 9/2000 | Fujita et al. |
| 6,121,869 | A * | 9/2000 | Burgess ....................... 338/99 |
| 6,287,253 | B1 | 9/2001 | Ortega et al. |
| 6,296,066 | B1 | 10/2001 | Terry et al. |
| 6,310,614 | B1 | 10/2001 | Maeda et al. |
| 6,369,803 | B2 | 4/2002 | Brisebois et al. |
| 6,441,118 | B2 | 8/2002 | Sherman et al. |
| 6,569,494 | B1 | 5/2003 | Chambers et al. |
| 6,809,137 | B2 * | 10/2004 | Matsuo et al. .............. 524/282 |
| 6,809,280 | B2 | 10/2004 | Divigalpitiya et al. |
| 6,815,874 | B2 | 11/2004 | Hermle et al. |
| 6,832,522 | B2 | 12/2004 | Schaefer et al. |
| 7,288,590 | B2 * | 10/2007 | Lechat et al. ............... 524/575 |
| 2001/0000915 | A1 | 5/2001 | Katchmar |
| 2002/0119255 | A1 | 8/2002 | Divigalpitiya et al. |
| 2003/0129302 | A1 | 7/2003 | Chambers et al. |
| 2003/0178221 | A1 | 9/2003 | Chiu et al. |
| 2003/0205450 | A1 | 11/2003 | Divigalpitiya et al. |
| 2004/0109096 | A1 | 6/2004 | Anderson et al. |
| 2006/0137462 | A1 * | 6/2006 | Divigalpitiya et al. ........ 73/760 |

FOREIGN PATENT DOCUMENTS

| | | | |
|---|---|---|---|
| EP | 1 172 831 | A2 | 1/2002 |
| GB | 2 049 290 | A | 12/1980 |
| GB | 2 134 322 | A | 8/1984 |
| GB | 2 233 499 | A | 1/1991 |
| JP | 59-188726 | | 10/1984 |
| JP | 60-65406 | | 4/1985 |
| JP | 1-132017 | | 5/1989 |
| JP | 5-143219 | | 6/1993 |
| JP | 7-219697 | | 8/1995 |
| JP | 7-296672 | | 11/1995 |
| JP | 2000-029612 | | 1/2000 |
| JP | 2001-228975 | | 8/2001 |
| WO | WO 00/00563 | | 1/2000 |
| WO | WO 03/094186 | A1 | 11/2003 |

OTHER PUBLICATIONS

U.S. Appl. No. 11/020,289, filed Dec. 23, 2004, entitled “Force Sensing Membrane”.

U.S. Appl. No. 11/021,913, filed Dec. 23, 2004, entitled “Adhesive Membrane for Force Switches and Sensors”.

* cited by examiner

INTERDIGITAL FORCE SWITCHES AND SENSORS

FIELD

This invention relates to force activated and force sensing electronic devices having an interdigital electrode.

BACKGROUND

Force switches and force sensing membranes are used in various applications to detect contact/touch, detect and measure a relative change in force or applied load, detect and measure the rate of change in force, and/or detect the removal of a force or load.

Force switches and force sensing membranes typically function by detecting a signal when otherwise separated conductive films, electrodes, or circuits are brought together under the application of force by a user.

Force sensing membranes, for example, typically consist of an elastomer comprising conductive particles (the "elastomeric layer") positioned between two conducting contacts. When pressure is applied to one of the conducting contacts, the conducting contact is pressed against the surface of the elastomeric layer, and conduction paths are created. The conduction paths are made up of chains of the conductive particles that make a tortuous path through the elastomer. Therefore, the concentration of conductive particles in the elastomer must be above a certain threshold (that is, above the percolation threshold) to make a continuous path. As pressure is increased, greater numbers and regions of contact between the conducting contact and the elastomeric layer's surface are created. Thus, a greater number of conduction paths through the elastomer and conductive particles are created, and the resistance across the elastomer layer is decreased.

SUMMARY

In view of the foregoing, we recognize that because the conduction paths in force switches and force sensing membranes of the prior art are made up of many conductive particle contacts, variations in resistance and hysteresis can result.

Briefly, in one aspect, the present invention provides interdigital electronic devices (for example, interdigital force switches and force sensors) wherein the concentration of conducting particles are less than the percolation threshold. The interdigital electronic devices comprise (a) a conductor, (b) an interdigital electrode, and (c) a composite material disposed between the conductor and the interdigital electrode.

As used herein, the term "interdigital electrode" refers to a digitlike or fingerlike periodic pattern of in-plane electrodes. FIG. 1 illustrates an exemplary interdigital electrode. Interdigital electrode 100 includes a pad area 115 comprising a fingerlike pattern and two traces 125. The pattern is made up of fifteen "fingers" 135. The term "interdigital" is also sometimes replaced in the art by equivalent terms such as, for example, "periodic," "microstrip," "comb" (or "combed"), "grating," or "interdigitated." It should be understood that this invention is not intended to be unduly limited by use of the term "interdigital" rather than these or any other equivalent terms in the art.

At least one of the conductor and the interdigital electrode is movable toward the other (that is, either the conductor is movable toward the interdigital electrode, or the interdigital electrode is movable toward the conductor, or both the conductor and the interdigital electrode are movable toward each other).

The composite material comprises conductive particles at least partially embedded in an electrically insulating layer. The conductive particles electrically connect the conductor and the interdigital electrode under application of sufficient pressure therebetween. The conductive particles have no relative orientation and are disposed so that substantially all electrical connections made between the conductor and the interdigital electrode are in the z direction (that is, substantially all electrical connections made between the conductor and the interdigital electrode are in the thickness direction of a relatively planar structure, not in the in-plane (x-y) direction).

The interdigital electronic devices of the invention therefore meet the need in the art for force switches and force sensors with less variation in resistance and hysteresis than those made up of many conductive particle contacts.

In addition, it has been discovered that when the conductor comprises a conductive coating on a film, the interdigital electronic devices of the invention are surprisingly sensitive.

Figure 1:
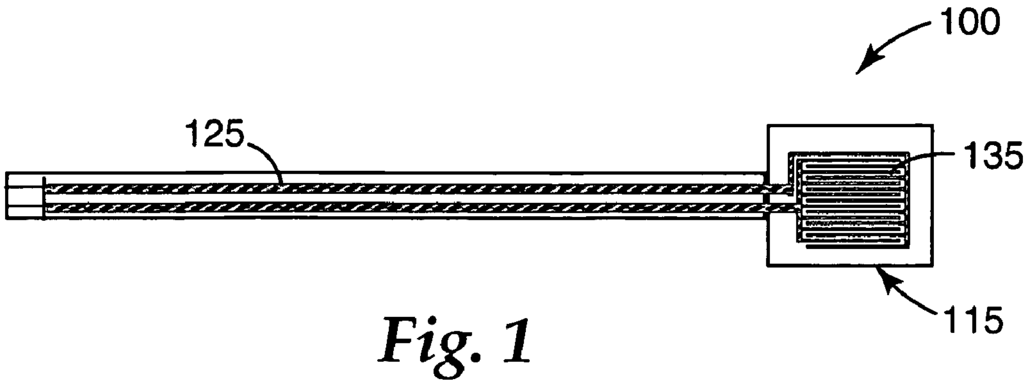
FIG. 1 is a schematic top view of an interdigital electrode.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The interdigital electronic devices of the invention can be used in various applications to detect contact/touch, detect and measure a relative change in force or applied load, detect and measure the rate of change in force, and/or detect the removal of a load or force.

When sufficient pressure is applied to an interdigital electronic device of the present invention, electrical contact is made between the conductor and the interdigital electrode. To make electrical contact between the conductor and the interdigital electrode, the present invention employs conductive particles preferably distributed in such a manner such that substantially all electrical contacts are through one or more single particles (that is, both the conductor and the interdigital electrode are in simultaneous electrical contact with the same particle or particles). The conductive particles are at least partially embedded in an electrically insulating layer. By insulating, it is meant that the material is substantially less conductive than the conductor and the conductive particles. As used herein, "insulating" materials or layers have a resistivity greater than about $10^9$ ohms.

The electrically insulating layer allows for the electrical connection made upon application of pressure to be substantially reduced when no pressure is applied.

For example, the electrically insulating layer can be a resilient material that can be deformed to allow electrical contact to be made upon the application of pressure, and that returns the conductor and the interdigital electrode to their initial separated positions when no pressure is applied.

Distributing the conductive particles so that electric contacts are made via one or more single particles can have several benefits. Because the conductor and the interdigital electrode are in electrical contact via single particles, there are at most only two contact points to contribute to contact resistance for each particle contact (a conductive particle contacting the conductor is one contact point, and the same conductive particle contacting the interdigital electrode is another contact point), and this number of contact points remains consistent for each activation of a particular interdigital electronic device. This can result in a relatively low contact resistance and a more consistent, reliable, and reproducible signal every time the device is activated. Lower contact resistance gives rise to less signal loss, which ultimately results in a higher signal to noise ratio, which can result in more accurate positional or pressure determinations in touch or force sensor devices.

Another advantage of single particle electrical contacts is the absence of particle alignment requirements and preferred particle-to-particle orientations. For example, application of a magnetic field during manufacturing is not required to orient and align the particles, making manufacturing easier and less costly. In addition, when magnetic alignment is used, the conductive particles span the entire thickness of the resulting film, requiring another insulating layer to be applied so that the overall construction is not conductive in the absence of pressure. The absence of particle alignment requirements can also improve durability relative to devices that employ aligned wires or elongated rods vertically oriented in the thickness direction of the device that can be subject to bending and breaking upon repeated activation and/or relatively high applied forces. The absence of particle alignment and orientation requirements makes the interdigital electronic devices of the present invention particularly suitable for applications where the device is to be mounted in curved, irregular, or otherwise non-flat configurations.

Interdigital electronic devices of the present invention can also be made very thin because the composite material need only be slightly larger than the largest conductive particles. Relatively low particle loadings can be used while still maintaining reliable performance and sufficient resolution. The particles can also be distributed so that the activation force (that is, the force required to activate the interdigital electronic device) is uniform across the surface of the membrane. The ability to use lower particle density can also be a cost advantage because fewer particles are used.

Figure 2:
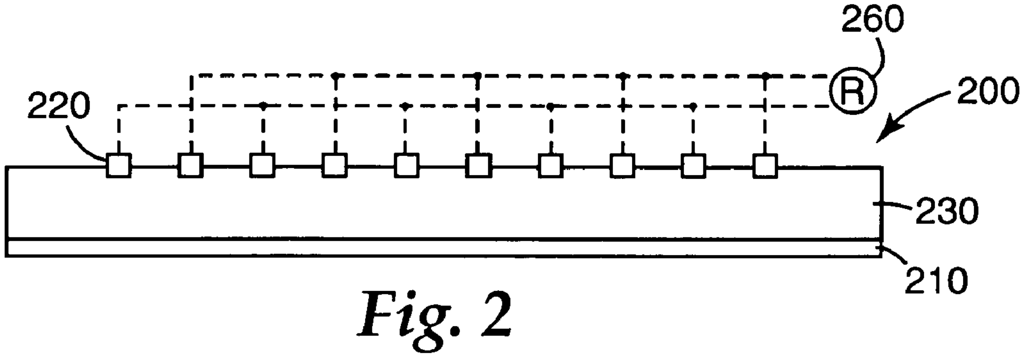
FIG. 2 is a schematic side view of an interdigital electronic device.

FIG. 2 shows an interdigital electronic device 200 that includes a conductor in the form of a conductive layer 210, an interdigital electrode 220, a composite material 230 between the conductor and the interdigital electrode, and means for measuring electrical response (shown here as resistance) across the interdigital electronic device 260. At least one of conductive layer 210 and interdigital electrode 220 is movable toward the other, for example, by application of external pressure. The composite material 230 has conductive particles wholly or partially embedded in an electrically insulating layer.

The conductive layer 210 can be a conductive sheet, foil, or coating. The material of the conductive layer can include any suitable conductive materials such as, for example, metals, semiconductors, doped semiconductors, semi-metals, metal oxides, organic conductors and conductive polymers, and the like, and mixtures thereof. Suitable inorganic materials include, for example, copper, gold, and other metals or metal alloys commonly used in electronic devices, as well as transparent conductive materials such as transparent conductive oxides (for example, indium tin oxide (ITO), antimony tin oxide (ATO), and like). Graphite can also be used. Suitable organic materials include, for example, conductive organic metallic compounds as well as conductive polymers such as polypyrrole, polyaniline, polyacetylene, polythiophene, and materials such as those disclosed in European Patent Publication EP 1172831.

For some applications (for example, healthcare/medical applications), it is preferable that the conductive layer be permeable to moisture vapor. Preferably, the moisture vapor transmission rate (MVTR) of the conductive layer is at least about 400 g water/$m^2$/24 hours (more preferably, at least about 800; even more preferably, at least about 1600; most preferably, at least about 2000) when measured using a water method according to ASTM E-96-00.

The conductor can be self-supporting or can be provided on a substrate (not shown in FIG. 2). Suitable substrates can be rigid (for example, rigid plastics, glass, metals, or semiconductors) or flexible (for example, flexible plastic films, flexible foils, or thin glass. Substrates can be transparent or opaque depending upon the application.

The conductor can also be a second interdigital electrode.

Preferably, the conductor comprises a metallic or conductive polymer coating provided on a plastic film. More preferably, the conductor comprises a metallic or conductive polymer coating on a polyester film. Most preferably, the conductor comprises a polyethylene-dioxithiophene (PEDOT), indium tin oxide (ITO), or transparent silver coating on a polyester film.

The interdigital electrode typically includes a conductive fingerlike pattern on an insulating substrate. The patterned conductive material can include any suitable conductive materials such as, for example, metals, semiconductors, doped semiconductors, semi-metals, metal oxides, organic conductors and conductive polymers, and the like, and mixtures thereof, as described above. Suitable substrates can be rigid (for example, rigid plastics or glass) or flexible (for example, flexible plastic films, thin glass, or fabrics). Substrates can be transparent or opaque depending upon the application.

Preferably, the interdigital electrode comprises silver ink or ITO on a plastic substrate. More preferably, the interdigital electrode comprises silver ink or ITO on a polyester substrate.

For some applications (for example, healthcare/medical applications) it is preferable that the substrate of the interdigital electrode be permeable to moisture vapor. Preferably, the moisture vapor transmission rate (MVTR) of the substrate is at least about 400 g water/$m^2$/24 hours (more preferably, at least about 800; even more preferably, at least about 1600; most preferably, at least about 2000) when measured using a water method according to ASTM E-96-00.

Useful methods for patterning the conductive material will depend upon the type of conductive material used. Some materials such as, for example, silver inks, silver-palladium inks, and carbon inks can be patterned using screen printing. Conductive coatings of alloys such as tin oxide, zinc oxide, indium tin oxide, antimony oxide, and antimony tin oxide can be sputtered or plasma deposited onto a polymer substrate, and then patterned using standard etching techniques. Other conductive materials can be deposited by electron beam thermal evaporation, and then patterned using conventional mask etching.

As is known in the art, the interdigital pattern can be adjusted by changing its area, the number of fingers, and/or the spacing between them in order to control the strength of their output signal. Typically, the spacing between the fingers of the interdigital electrode will be larger than the conductive particles in order to prevent shorting.

The composite material disposed between the conductor and the interdigital electrode includes conductive particles at least partially embedded in an electrically insulating layer. The conductive particles are disposed so that when pressure is applied to the device to move the conductor or the interdigital electrode relative to the other (that is, to move the conductor toward the interdigital electrode, or vice versa), an electrical connection can be made through single particles contacting both the conductor and the interdigital electrode.

Exemplary materials for the electrically insulating layer include those materials that can maintain sufficient electrical separation between the conductor and the interdigital electrode, and that exhibit deformability and resiliency properties that allow the insulating material to be compressed to allow electrical contact of the conductors via one or more single particle contacts and to return the conductor and the interdigital electrode to an electrically separated state when sufficient pressure is no longer being applied between them. Suitable insulating materials include silicones, polysiloxanes, polyurethane, polysilicone-polyurethanes, rubber, ethylene-vinyl acetate copolymers, phenolic nitrile rubber, styrene butadiene rubber, polyether-block-amides, and polyolefins, and the like.

For some applications (for example, healthcare/medical applications) it is preferable that the electrically insulating layer be permeable to moisture vapor. Preferably, the moisture vapor transmission rate (MVTR) of the elastomeric material is at least about 400 g water/m$^2$/24 hours (more preferably, at least about 800; even more preferably, at least about 1600; most preferably, at least about 2000) when measured using a water method according to ASTM E-96-00.

In some applications, it is also preferable that the electrically insulating layer material is not substantially affected by humidity.

Figure 3A:
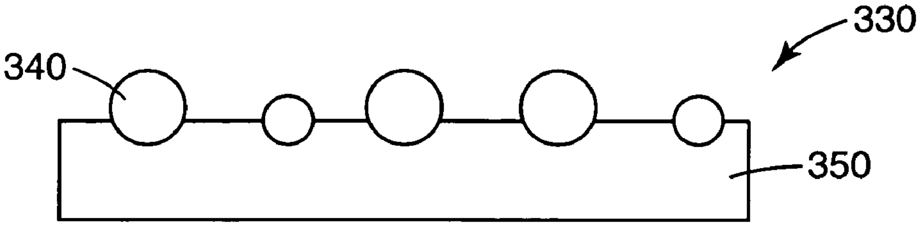
FIGS. 3(*a*) and (*b*) are schematic side views of composite materials useful in an interdigital electronic device of the invention.
Figure 3B:
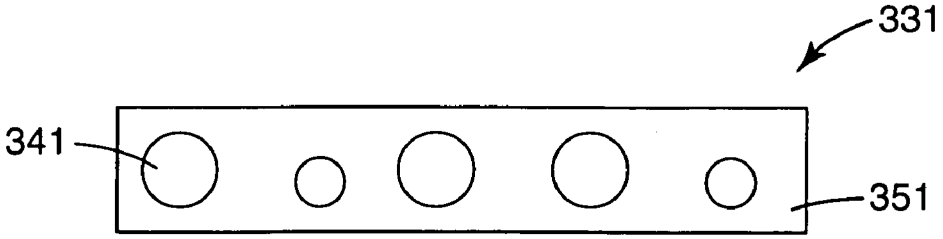
Figure 4A:
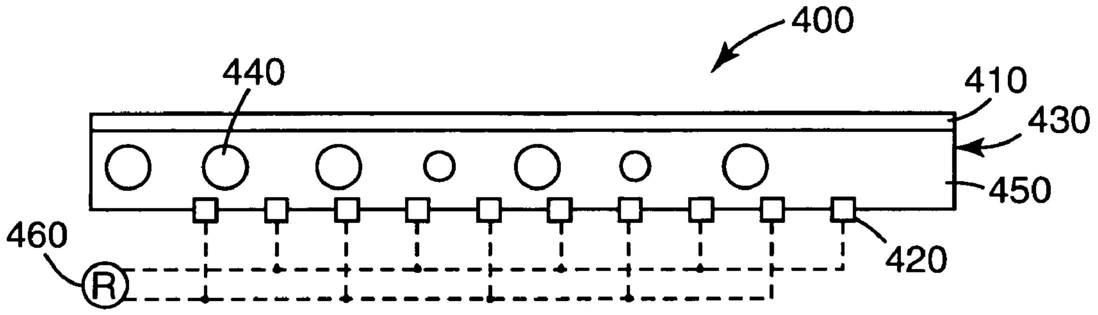
FIGS. 4(*a*), (*b*), (*c*), and (*d*) illustrate the use of an interdigital electronic device of the invention using schematic side views of an interdigital electronic device of the invention.
Figure 4B:
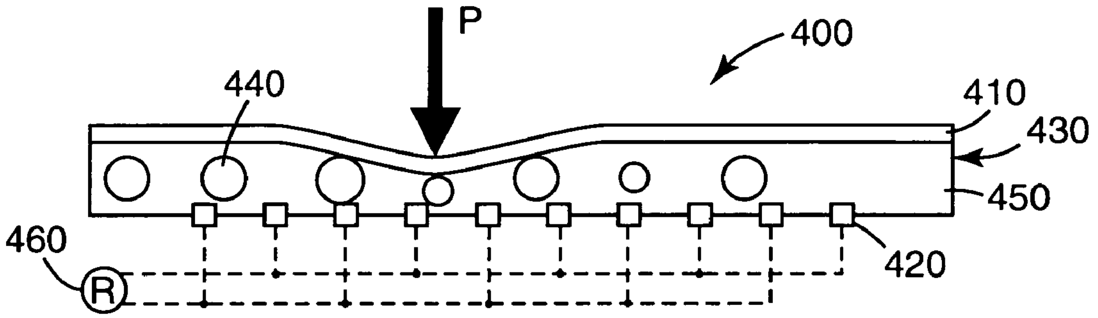
Figure 4C:
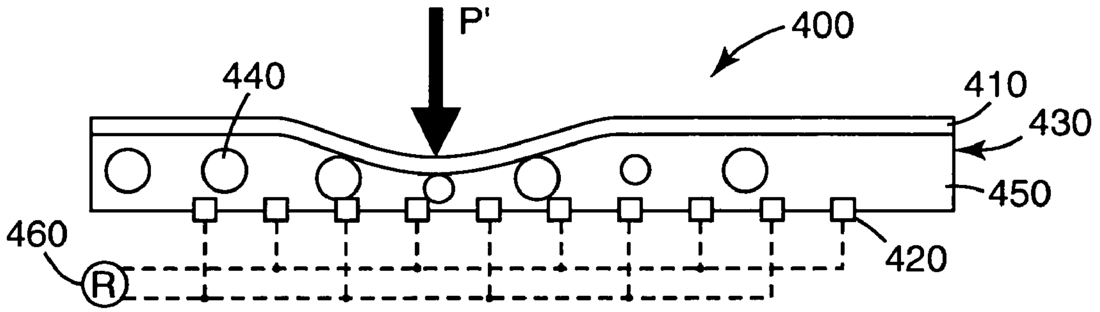
Figure 4D:
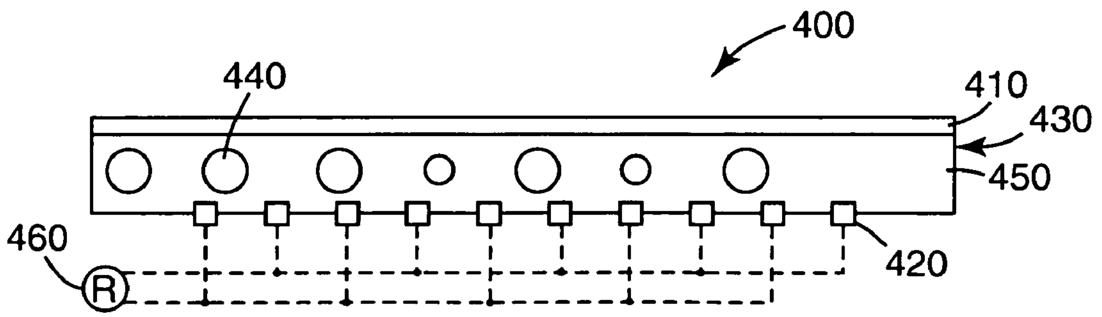

FIG. 3(*a*) shows one example of a composite material 330 that includes conductive particles 340 partially embedded in an electrically insulating layer 350. FIG. 3(*b*) shows an example of another composite material 331 that includes conductive materials 341 completely embedded in an electrically insulating layer 351. While FIGS. 3(*a*) and (*b*) serve to illustrate embodiments of a composite material useful in the present invention, any suitable arrangement where conductive particles are embedded fully or partially in any suitable ratio at any suitable position with respect to any particular surface of the elastomeric layer or material can be used. The present invention does not exclude composite materials having isolated instances where conductive particles overlap in the thickness direction of the device.

Preferably, the largest conductive particles are at least somewhat smaller than the thickness of the layer of electrically insulating material, at least when the particle size is measured in the thickness direction (z) of the composite. This can help prevent electrical shorting.

Suitable conductive particles include any suitable particles that have a contiguously conductive outer surface. For example, the conductive particles can be solid particles (for example, metallic spheres), solid particles coated with a conductive material, hollow particles with a conductive outer shell, or hollow particles coated with a conductive material. The conductive material can include, for example, metals, conductive metal oxides, organic conductors and conductive polymers, semiconductors, and the like. The core of coated particles can be solid or hollow glass or plastic beads, ceramic particles, carbon particles, metallic particles, and the like. The conductive particles can be transparent, semi-transparent, colored, or opaque. They can have rough or smooth surfaces, and can be rigid or deformable.

The term “particles” includes spherical beads, elongated beads, truncated fibers, irregularly shaped particles, and the like. Generally, particles include particulate objects that have aspect ratios (that is, the ratio of the narrowest dimension to the longest dimension (for example, for a fiber the aspect ratio would be length: diameter) of 1:1 to about 1:20, and have characteristic dimensions in a range of about 1 μm to about 500 μm, depending upon the application. The conductive particles are dispersed in the composite material without any preferred orientation or alignment.

Composite materials can be provided in any suitable manner. Generally, making or providing the composite material involves distributing the conductive particles and at least partially embedding the conductive particles in the electrically insulating material. For example, the particles can first be distributed on a surface and the electrically insulating material coated over, pressed onto, or laminated to the layer of particles. The surface of the particles are distributed onto can be a layer of the interdigital electronic device, for example the conductor, or a carrier substrate that is removed after the particles are embedded into the electrically insulating material. As another example, the particles can be dispersed in the electrically insulating material and the resulting composite can be coated to form the composite material. As still another example, the electrically insulating material can be provided as a layer, for example by coating, and then the conductive particles can be distributed on the layer of electrically insulating material. The particles can be embedded by pressing the particles into the layer of electrically insulating material, with optional heating of the electrically insulating material to allow the material to soften, or by distributing the particles on, and optionally pressing the particles into, the electrically insulating material layer when the electrically insulating material is in an uncured or otherwise softened state and subsequently hardening the electrically insulating material layer by curing, cooling, or the like. Thermal, moisture, and light cure reactions can be employed, as well as two part systems.

Methods of dispersing the conductive particles include, for example, those disclosed in U.S. Patent App. Pub. No. 03/0129302 (Chambers et al.), which is herein incorporated by reference in its entirety. Briefly, the particles can be dispensed onto a layer of the electrically insulating material in the presence of an electric field to help distribute the particles as they randomly land on the layer. The particles are electrically charged such that they are mutually repelled. Therefore, lateral electrical connections and particle agglomeration are substantially avoided. The electric field is also used to create attraction of the particles to the film. Such a method can produce a random, non-aggregating distribution of conductive particles. The particles can be applied at a preselected density with a relatively uniform (number of particle per unit area) distribution of particles. Also, the web can be buffed to further aid in the particle distribution.

Other methods of dispersing the conductive particles can also be used. For example, the particles can be deposited in the pockets of micro-replicated release liner as disclosed in International Pub. WO 00/00563, which is herein incorporated by reference in its entirety. The electrically insulating material would then be coated on or pressed against this particle-filled liner.

Any other method for distributing or dispersing the particles can be used provided that the particles are so distributed in the composite material that substantially all electrical contacts made between the conductor of the adhesive membrane and a second conductor are through one or more single particle contacts. As such, care should be taken to reduce or eliminate the occurrence of stacked particles in the composite (that is, two or more particles having overlapping positions in the thickness direction of the composite).

The methods used to place particles onto the medium should ensure that the contact between particles in the in-plane (x-y) direction is minimized. Preferably, no more than two particles should be in contact (for example, in a 30 $cm^2$ area). More preferably, no two particles are in contact with each other (for example, in a 30 $cm^2$ area). This will prevent any electrical shorting in the in-plane direction due to particle contact.

The conductive particles can have a size distribution such that all the particles are not identical in size (or shape). In these circumstances, the larger conductive particles can make electrical contact before, or even to the exclusion of smaller neighboring particles. Whether and to what extent this occurs depends on the size and shape distribution of the particles, the presence or absence of particle agglomeration, the loading density and spatial distribution of the particles, the ability for the conductor (or conductor/substrate combination) to flex and conform to local variations, the deformability of the particles, the deformability of the material in which the particles are embedded, and the like. These and other properties can be adjusted so that a desirable number of single particle electrical contact per unit are made when sufficient pressure is applied between the conductor and the interdigital electrode. Properties can also adjusted so that a desirable number of single particle electrical contact per unit are made when at one given amount of pressure versus a different amount of pressure applied between the conductor and the interdigital electrode.

In some embodiments, it can be preferable for the particle size distribution to be relatively narrow, and in some circumstances it can be preferable that all the particles are substantially the same size. In some embodiments, it can be desirable to have a bimodal distribution of particle sizes. For example, it can be desirable to have two different types of particles, larger particles and smaller particles, dispersed in the composite material.

FIGS. 4(*a*), (*b*), (*c*), and (*d*) illustrate the use of an interdigital electronic device of the invention that is an interdigital force sensor in which electrical contact is achieved by physical contact through one or more single particles. Interdigital electronic device 400 includes a conductor 410, an interdigital electrode 420, composite material 430 comprising conductive particles 440 in an electrically insulating layer 450 disposed between the conductors, and means for measuring electrical response across the interdigital electronic device 460.

When the interdigital electronic device is to be used for force sensing applications, the electrically insulating layer needs to be capable of returning to substantially its original dimensions on the release of pressure. As used herein, "capable of returning to substantially its original dimensions" means that the layer is capable of returning to at least 90 percent (preferably at least 95 percent; more preferably, at least 99 percent; most preferably 100 percent) of its original thickness within, for example, 10 seconds (preferably, within 1 second or less). Preferably, the electrically insulating layer (in its fully cured state if curable material) has a substantially constant storage modulus (G') over a large temperature range (more preferably, a substantially constant storage modulus between about 0° C. and about 100° C.; most preferably, a substantially constant storage modulus between about 0° C. and about 60° C.). As used herein, "substantially constant" means less than about 50 percent (preferably, less than 75 percent) variation. Preferably, the electrically insulating layer has a G' between about $1\times10^3$ Pa and about $9\times10^5$ Pa and a loss tangent (tan delta) between about 0.01 and about 0.60 at 1 Hz at 23° C. It is also preferable that the electrically insulating layer be self-healing (that is, capable of healing itself when cracked, punctured, or pierced).

Suitable materials for the electrically insulating layer for use in force sensing applications include, for example, natural and synthetic rubbers (for example, styrene butadiene rubber or butyl rubber, polyisoprene, polyisobutylene, polybutadiene, polychloroprene, acrylonitrile/butadiene as well as functionalized elastomers such as carboxyl or hydroxyl modified rubbers, and the like), acrylates, silicones including but not limited to polydimethylsiloxanes, styrenic block copolymers (for example, styrene-isoprene-styrene or styrene-ethylene/butylene-styrene block copolymer), polyurethanes including but not limited to those based on aliphatic isocyanate, aromatic isocyanate and combinations thereof, polyether polyols, polyester polyols, glycol polyols, and combinations thereof. Suitable thermoplastic polyurethane polymers are available from BF Goodrich under the Estane™ name. Thermoset formulations can also be used by incorporating polyols and/or polyisocyanates with an average functionality higher than two (for example, trifunctional or tetrafunctional components). Polyureas such as those formed by reaction of a polyisocyanate with a polyamine can also be suitable. Suitable polyamines can be selected from a broad class including polyether and polyester amines such as those sold by Huntsman under the Jeffamine™ name, and polyamine functional polydimethylsiloxanes such as those disclosed in U.S. Pat. No. 6,441,118 (Sherman et al.); elastomeric polyesters such as those by DuPont under the Hytrel™ name; certain metallocene polyolefins such as metallocene polyethylene (for example, Engage™ or Affinity™ polymers from Dow Chemical, Midland Mich.) can also be suitable. Fluorinated elastomers such Dyneon™ fluoroelastomers (available from Dyneon LLC, Oakdale, Minn.) or Viton™ fluoroelastomers (available from DuPont Performance Elastomers, Wilmington, Del.) can also be suitable. The elastomeric materials can be modified, for example, with hydrocarbon resins (for example, polyterpenes) or extending oils (for example, naphthenic oils or plasticizers), or by the addition of organic or inorganic fillers such as polystyrene particles, clays, silica, and the like. The fillers can have a particulate or fibrous morphology. Microspheres (for example, Expancel™ microspheres from Akzo Nobel) can also be dispersed in the elastomeric material.

As shown in FIG. 4(*a*), when no pressure is applied between the conductor 410 and the interdigital electrode 420, they remain electrically isolated by the electrically insulating elastomeric layer 450. As shown in FIG. 4(*b*), when sufficient pressure P is applied to the conductor 410, an electrical contact can be made between the conductor 410 and the interdigital electrode 420 via single particle contacts. Single particle contacts are those electric contacts between the conductor and the interdigital electrode where one or more single conductive particles individually contact both the conductor and the interdigital electrode. As shown in FIG. 4(*c*), when more pressure P' is applied to the conductor 410, the elastomeric layer 450 further compresses and more single particle contacts can be made. As shown in FIG. 4(*d*), when all pressure is removed, the elastomeric layer 450 returns to substantially its original dimensions and no electric contacts are made.

Figure 5:
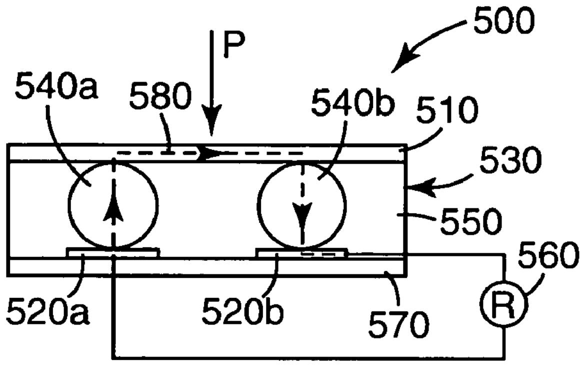
FIG. 5 is a schematic side view of an interdigital electronic device that illustrates conduction path.

FIG. 5 illustrates the conduction path in an activated interdigital electronic device of the invention. In device 500, sufficient pressure P is applied to the conductor 510, and electrical contact is made between the conductor 510 and the interdigital electrode 520 (shown disposed on a substrate 570) via single particle contacts. The conduction path 580 travels through a first finger of the interdigital electrode 520(*a*) and a first conductive particle 540(*a*), across the conductor 510, and down through a second conductive particle 540(*b*) and second finger of the interdigital electrode 520(*b*). The two fingers of the interdigital electrode are connected to means for measuring electrical response across the interdigital electronic device 560.

An interdigital electronic device of the present invention can be electrically connected to means for measuring electrical response (for example, resistance, conductance, current, voltage, and the like) in order to detect a force or to measure the change in force across the device. The means for measuring electrical response can be connected, for example, to two fingers or the traces of the interdigital electrode, or connected to a part of the interdigital electrode and the conductor. The electrical response can be read out using any suitable means (for example, with an ohm meter, a multimeter, an array of light emitting diodes (LEDs), or audio signal with the appropriate circuitry).

An interdigital electronic devices of the invention can also be used in the manner described above, but wherein the interdigital electrode moves toward the conductor.

The interdigital electronic devices of the invention are useful in many applications as switchable force activated electronic devices and force sensing devices. Force switches are useful, for example, as membrane switches and touch panels. Force sensors are useful in healthcare applications such as for alerting of excessive pressure under casts, or for monitoring pressure for the prevention of bedsores and diabetic foot or leg ulcers. They are also useful, for example, in automotive applications (for example in seat sensors or for air bag deployment), consumer applications (for example, as load/weight sensors or in "smart systems" to sense the presence or lack thereof of an article on shelf), manufacturing applications (for example, to monitor nip roll pressure), sporting applications (for example, to monitor speed, force or impact, or as grip sensors on clubs or racquets), and the like.

EXAMPLES

Objects and advantages of this invention are further illustrated by the following examples, but the particular materials and amounts thereof recited in these examples, as well as other conditions and details, should not be construed to unduly limit this invention.

Testing Unit

Devices were evaluated using an apparatus called the force apparatus, which consists of a load cell (model LCFD-1 kg from Omega Engineering Inc., Hartford, Conn.) that measures the applied normal force on the device. The device to be evaluated was placed on the load cell horizontally and secured with tape. A pneumatically operated cylinder (model E9X 0.5N from Airpot Corporation, Norwalk, Conn.) connected to two valves (model EC-2-12 from Clippard Instrument Laboratory, Cincinnati, Ohio), under computer control with compressed air at about 275 kPa, was located directly above the load cell. By opening and closing the valves in a sequence, the cylinder was moved downwards in pre-determined constant steps to increase the force on the device which was placed on the load cell. The load cell was connected to a display device (Model DP41-S-A available form Omega Engineering Inc. Hartford, Conn.) that displayed the applied force. Once a pre-determined limit of the force was reached, the air was vented from the system using a vent valve to reduce the force on the device.

The device was connected to a multimeter to record the device's electrical response. The resistance of the device was measured using a digital multimeter (Keithley Model 197A microvolt DMM from Keithley Inc., Cleveland, Ohio). The applied force as read from the load cell and the electrical response of the device as read from the multimeter were captured with a PC based data acquisition system. The force applied ranged from 10 to 1000 gram weight, and the application of force was done at a rate of about 2.8 gram/s (167 g/min).

Explanation of n-Value

When the resistance across a device is measured, the response of resistance versus force can be plotted in a log-log plot. In a certain range, the power law relation can be given by the formula: resistance=$A/F^n$, where A is a constant, F is force, and n (the "n-value") is the slope of the best-fit line (determined by linear regression) on log-log plot. The n-value indicates the sensitivity of the device. The higher the n-value, the larger the change in resistance of the device for a given change in applied force. A lower n-value means a smaller change in resistance for the same change in applied force.

General Procedure

A layer (about 25 microns thick) of uncured elastomer was knife coated onto a conductor. The composition of the elastomer, expressed in phr (parts per hundred parts of rubber), was:

| | |
|---|---|
| 100 phr | Vinyl modified poly dimethyl siloxane, available as Y-7942 from Crompton (Greenwich, CT) |
| 0.33 phr | Platinum fine powder, available from Aldrich Canada (Oakville, ON, Canada) |
| 0.80 phr | DC1107 cross linker, available from Dow Corning (Midland, MI) |
| 0.60 phr | Dimethyl maleate, available from Fischer Scientific (Ottawa, ON, Canada) |

Glass beads coated with indium tin oxide (ITO), commercially available as SD120 from 3M Company (St. Paul, Minn.), were screened using commercially available sieves well known in the art to select beads in sizes less than about 50 microns. The beads were dispensed over the uncured layer of elastomer using a particle dispenser essentially as described in U.S. Patent Application Pub. No. 03/0129302 (Chambers et al.). The elastomer was allowed to cure at room temperature. A second conductor or an interdigital electrode was then secured on the cured elastomer to form a device. The resulting device was tested using the force apparatus described above.

Examples 1-6

Interdigital devices with a metallic film or metal foil conductor (as indicated in the below table) were constructed according to the general procedure. The interdigital electrodes, purchased from ClickTouch America, Inc., Saint-Laurent, Quebec, Canada, were constructed by screen printing silver ink on 250 micron thick polyester substrate. A schematic of the interdigital electrodes is shown in FIG. 1. The fingerlike pattern (with fifteen "fingers") measured 10 mm×10 mm. The traces were 9 mm long, and 0.25 mm apart from each other.

Figure 6:
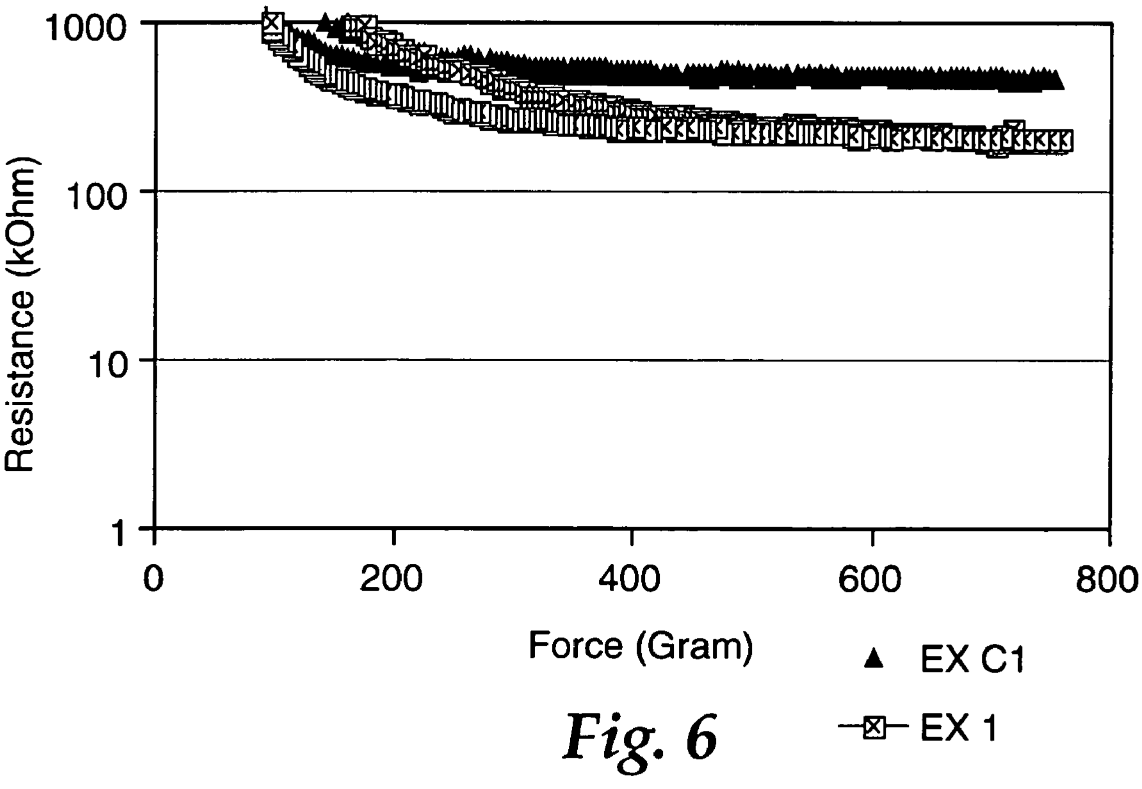
FIG. 6 is a plot of resistance versus force on a log-log scale for interdigital electronic devices of the invention described in Example 1 and Comparative Example 1.
Figure 7:
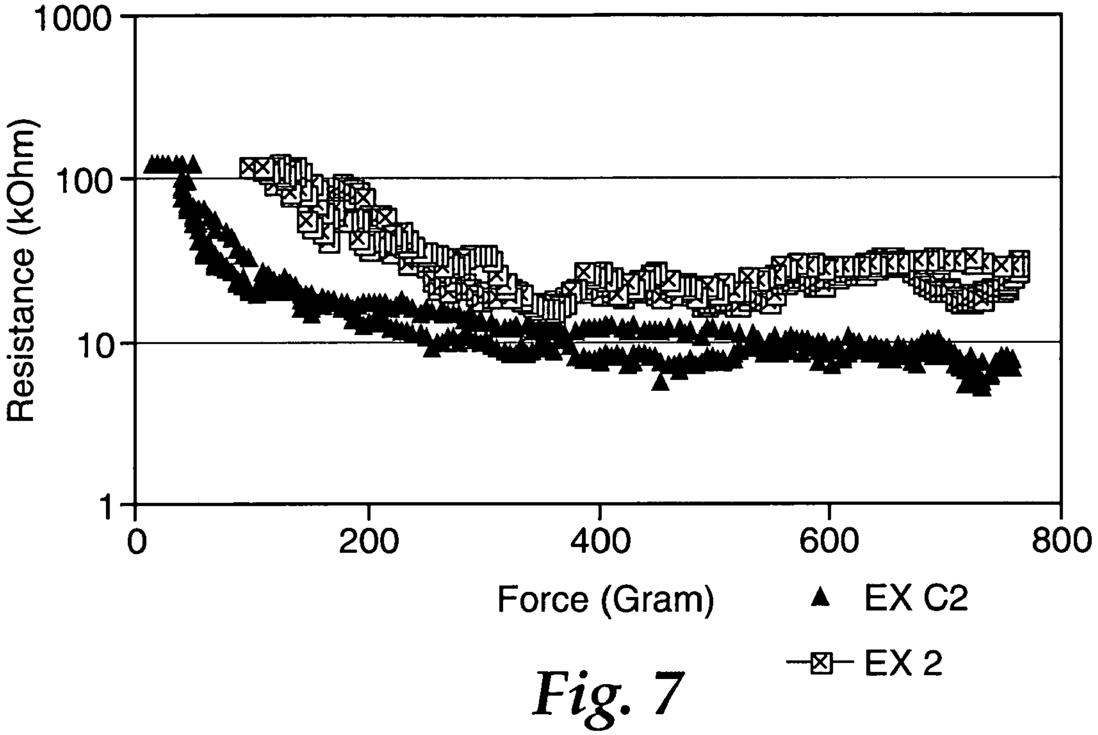
FIG. 7 is a plot of resistance versus force on a log-log scale for interdigital electronic devices of the invention described in Example 2 and Comparative Example 2.
Figure 8:
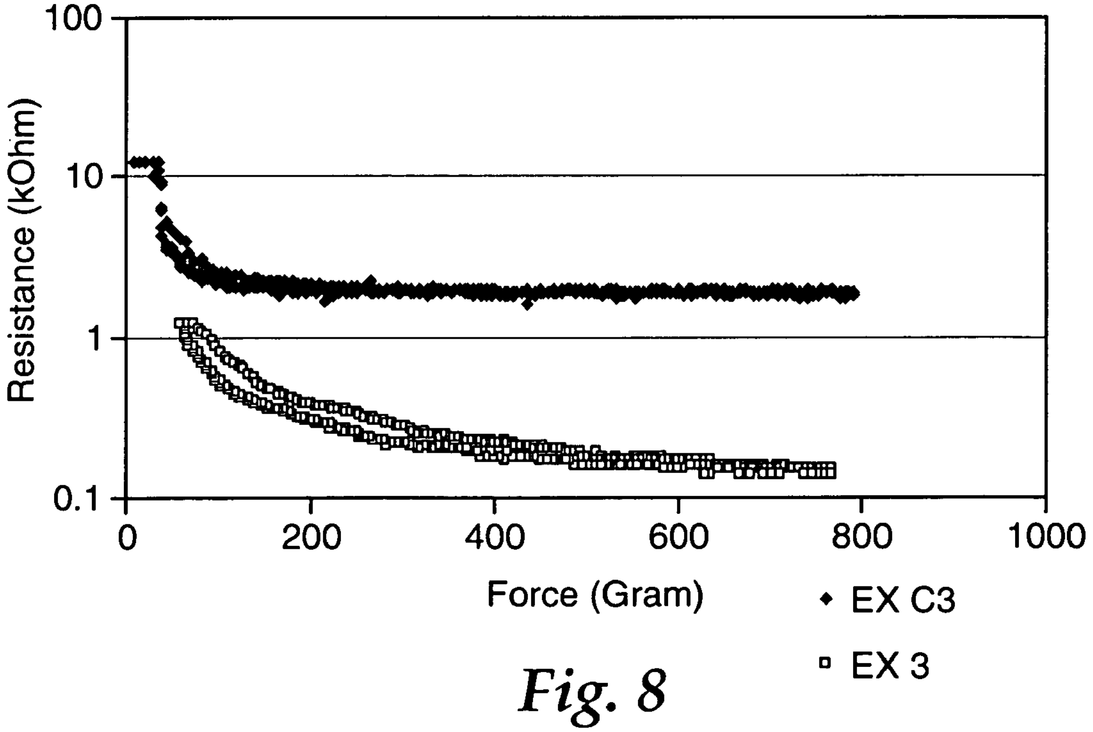
FIG. 8 is a plot of resistance versus force on a log-log scale for interdigital electronic devices of the invention described in Example 3 and Comparative Example 3.

The interdigital devices were tested using the force apparatus described above. The test data for Examples 1-3 are plotted on a log-log plot are shown in FIGS. 6, 7, and 8 respectively (with test data from Comparative Examples 1-3). The n-value of the best fit line for each interdigital device is shown in the table below. The activation force ($F_i$) of each interdigital device, defined as the force necessary to show a resistance of 1 kOhm is also shown.

Comparative Examples 1-3

Devices with elastomer sandwiched between two metallic film conductors (as indicated in the below table) were constructed according to the general procedure. The devices were tested using the force apparatus described above. The test data for are plotted on a log-log plot is shown in FIGS. 6, 7, and 8 (with test data from Examples 1-3). The n-value of the best fit line for each interdigital device is shown in the table below. The activation force ($F_i$) of each device, defined as the force necessary to show a resistance of 1 kOhm is also shown.

| Ex. No. | Conductor 1 | Conductor 2 | Conductor 2 Supplier | $F_i$ (gram) | Slope, n-value |
|---|---|---|---|---|---|
| 1 | Interdigital | Orgacon ™ PEDOT on polyester film | AGFA, Ridgefield Park, NJ | 100 | 0.666 |
| C1 | Orgacon ™ PEDOT on polyester film | Orgacon ™ PEDOT on polyester film | AGFA, Ridgefield Park, NJ | 100 | 0.299 |
| 2 | Interdigital | AgHT4 (transparent silver) on polyester film | CP Films, Martinsville, VA | 80 | 0.705 |
| C2 | AgHT4 (transparent silver) on polyester film | AgHT4 (transparent silver) on polyester film | CP Films, Martinsville, VA | 50 | 0.675 |
| 3 | Interdigital | ITO on polyester film | 3M Co., St. Paul, MN | 50 | 0.725 |
| C3 | ITO on polyester film | ITO on polyester film | 3M Co., St. Paul, MN | 30 | 0.264 |
| 4 | Interdigital | Al foil | Shop-Aid, Inc., Woburn, MA | 40 | 0.434 |
| 5 | Interdigital | Cu foil | Shop-Aid, Inc., Woburn, MA | 30 | 0.531 |
| 6 | Interdigital | Ni foil | Shop-Aid, Inc., Woburn, MA | 20 | 0.436 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An interdigital electronic device comprising:

(a) a conductor;

(b) an interdigital electrode; and (c) a composite material disposed between the conductor and the interdigital electrode for electrically connecting the conductor and the interdigital electrode under application of sufficient pressure therebetween, the composite material comprising conductive particles at least partially embedded in an electrically insulating layer;

the conductive particles having no relative orientation and being disposed so that substantially all electrical connections made between the conductor and the interdigital electrode are in the z direction, and the electrically insulating layer comprising an elastomeric material that has a substantially constant G' between about 0° C. and about 100° C. and being capable of returning to substantially its original dimensions on the release of pressure;

wherein at least one of the conductor and the interdigital electrode is movable toward the other; and wherein the device is a force sensor.

2. The interdigital electronic device of claim 1 wherein the conductive particles are disposed so that substantially all electrical connections made between the conductor and the interdigital electrode are through single particles.

3. The interdigital electronic device of claim 2 wherein the conductive particles are disposed so that no more than two particles are in contact with each other.

4. The interdigital electronic device of claim 3 wherein no two particles are in contact with each other.

5. The interdigital electronic device of claim 1 wherein the conductor comprises a metallic coating provided on a plastic film.

6. The interdigital electronic device of claim 5 wherein the metallic coating and plastic film are transparent.

7. The interdigital electronic device of claim 1 wherein the conductor comprises an interdigital electrode.

8. The interdigital electronic device of claim 1 wherein the interdigital electrode is disposed on a substrate.

9. The interdigital electronic device of claim 8 wherein the substrate is flexible.

10. The interdigital electronic device of claim 8 wherein the substrate is transparent.

11. The interdigital electronic device of claim 1 wherein the conductor and the interdigital electrode are transparent.

12. The interdigital electronic device of claim 11 wherein at least one of the conductor and the interdigital electrode comprises a transparent conductive oxide.

13. The interdigital electronic device of claim 1 wherein the electrically insulating layer comprises an elastomeric material that has a substantially constant G' between about 0° C. and about 60° C.

14. The interdigital electronic device of claim 1 wherein the electrically insulating layer comprises an elastomeric material that has a G' between about $1\times10^3$ Pa and about $9\times10^5$ Pa and a loss tangent between about 0.01 and about 0.60 at 1 Hz at 23° C.

15. The interdigital electronic device of claim 1 wherein the electrically insulating layer comprises an elastomeric material that is self-healing.

16. The interdigital electronic device of claim 1 further comprising means for measuring dynamic electrical response across the device.

17. The interdigital electronic device of claim 16 wherein the means for measuring dynamic electrical response across the device is connected to two fingers of the interdigital electrode.

18. The interdigital electronic device of claim 16 wherein the means for measuring dynamic electrical response across the device is connected to the interdigital electrode and the conductor.

19. The interdigital electronic device of claim 16 wherein the means for measuring dynamic electrical response across the device can measure a relative change in force.

20. The interdigital electronic device of claim 16 wherein the means for measuring dynamic electrical response across the device can measure a rate of change in force.

* * * * *

UNITED STATES PATENT AND TRADEMARK OFFICE

CERTIFICATE OF CORRECTION

PATENT NO. : 7,509,881 B2
APPLICATION NO. : 11/192780
DATED : March 31, 2009
INVENTOR(S) : Ranjith Divigalpitiya It is certified that error appears in the above-identified patent and that said Letters Patent is hereby corrected as shown below:

Column 12
Line 19, In Claim 1, after “layer” delete “;” and insert -- , --, therefor.

Signed and Sealed this

Twenty-third Day of June, 2009

JOHN DOLL
*Acting Director of the United States Patent and Trademark Office*